(12) United States Patent
Shibuya et al.

(10) Patent No.: US 7,130,076 B2
(45) Date of Patent: Oct. 31, 2006

(54) IMAGE OUTPUT DEVICE AND TEST CHART FOR THE SAME

(75) Inventors: Takeshi Shibuya, Chiyoda (JP); Yukio Yamamoto, Fujishiro (JP); Naoyuki Urata, Hadano (JP); Toshiyuki Yamada, Hadano (JP); Natsuhiko Hirayama, Hadano (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 705 days.

(21) Appl. No.: 09/911,715

(22) Filed: Jul. 25, 2001

(65) Prior Publication Data

US 2002/0030832 A1 Mar. 14, 2002

(30) Foreign Application Priority Data

Jul. 27, 2000 (JP) .............................. 2000-231402

(51) Int. Cl.
*B41J 1/00* (2006.01)
*H04N 1/00* (2006.01)

(52) U.S. Cl. ...................... 358/1.9; 358/406; 358/504
(58) Field of Classification Search ................ 358/406, 358/504, 300, 521, 534, 1.9; 347/19
See application file for complete search history.

(56) References Cited

U.S. PATENT DOCUMENTS 5,347,369 A * 9/1994 Harrington .................. 358/401

5,917,511 A * 6/1999 Ueda ........................... 347/19

FOREIGN PATENT DOCUMENTS

| JP | A-10-6562 | 1/1989 |
|---|---|---|
| JP | A-7-128974 | 5/1995 |
| JP | A-2000-4359 | 7/2000 |

* cited by examiner

*Primary Examiner*—Thomas D. Lee
(74) *Attorney, Agent, or Firm*—Antonelli, Terry, Stout and Kraus, LLP.

(57) ABSTRACT

In an image output device a test chart 18 including tests charts 6 of each color is used, and a tone correction table is calculated. The test charts 6 are patterned in a checkered pattern, each including continuous areas 10 in which the tones increase in steps and reference areas 11 for comparison with the continuous areas 10. The reference areas 11 are formed of white ground of paper in a highlight proof part 7, a solid pattern with a maximum density in a shadow proof part 8, and halftone dot-concentrated or line screens with a lower resolution than in the continuous areas in a middle proof part 9. Tone correction values are calculated from characteristic values of the highlight, shadow and middle parts, obtained from visual data of the test chart 18.

40 Claims, 11 Drawing Sheets

IMAGE OUTPUT DEVICE AND TEST CHART FOR THE SAME

BACKGROUND OF THE INVENTION

The present invention relates to an image output device, such as a laser printer and to a test chart for calibration of tone reproduction characteristics in the image output device, and also concerns a method and a device of calibration using the test chart.

The electrophotographic type printer forms an electrostatic latent image by radiating a laser beam to a photosensitive body, and neutralizes the latent image by a toner oppositely charged with respect to the polarity of the latent image.

As disclosed in JP-A-07-128974, because the quantity of electric charge on the toner particles varies with environmental conditions, such as temperature and humidity, the density of a reproduced image changes with environmental conditions. For example, when temperature and humidity are high, electric charge per unit toner particle decreases, and on the other hand, when temperature and humidity are low, electric charge per unit toner increases.

It is a general tendency of electrophotographic printers that under high temperature and humidity, compared with low temperature and humidity, a problem rises that a larger amount of toner is required for the above-mentioned neutralization and therefore reproduced images have high density.

Further, with electrophotographic printers, it is widely known that there are instrument errors, in other words, variation occurs in the development characteristics among different machines due to assembly tolerances related to laser spot diameter and laser intensity-sensitive material characteristics, and that the development characteristics change with time.

The above-mentioned variation and changes with time are corrected by high-level feedback and also by calibration by service persons using a calorimeter or the like, but those methods contribute to increases in production and running costs.

As countermeasures against changes mentioned above, there have been proposed a method disclosed in JP-A-07-128974 mentioned above, in which the developing machine is controlled by a toner densitometer and temperature and humidity sensors, and another method disclosed in JP-A-10-6562, in which a color printer is calibrated by comparison with a test chart, with which a halftone patch previously printed to a reference density.

There is growing demand for color printers from general users with widespread use of personal computers. To meet this demand, it is required that the color printers be made available at lowest possible prices.

If color laser printers are equipped with a toner densitometer or temperature and humidity sensors as suggested in JP-A-07-128974, this will lead to higher prices. In the method of calibrating a color printer by comparison with a test chart using a halftone patch printed in advance to a reference density as disclosed in JP-A-10-6562, know-how or experience is required to achieve desired precision and this method is difficult for general users to use.

When the prior art in JP-A-07-128974 is used, in which the relation between specified tone values and photographic printing density (or lightness or saturation) is not necessarily linear, in methods of controlling toner density or maximum laser intensity, even though being effective in stabilizing the density (or lightness or saturation) of the solid (shadow) areas of reproduced images, these methods have a problem that the density (or lightness or saturation) of halftones cannot be made stable.

In the prior art in JP-A-10-6562, because discoloring occurs in the colors in reference charts, calibration references change with time, it has been difficult to maintain desired precision in calibration. The user must carefully manage those charts, a fact which, as well as the discoloring problem, has been a burden on the user while he or she is using related equipment.

SUMMARY OF THE INVENTION

The present invention has as its object to provide a calibration method for color laser printers, for which tone reproduction characteristics can be calibrated easily using test charts that can be observed visually, and also provide test charts for color printers, which make highly accurate calibration possible.

The above objects may be achieved by an image output device that prints halftone densities on a medium by dot-concentrated screen or line screen that occur in fixed frequencies or by area changes in random dots, which are each formed with a plurality of pixels. This image output device may include halftone patterns that change in density in steps, test chart data including a reference density pattern displayed in frequency different from tone patterns, and a calculating means for calculating a tone correction table for printers from tone values from results of test chart data output on the medium, wherein the tone reproduction characteristics of the image output device may be corrected based on values in the tone correction table calculated by the calculating means.

The above objects may be achieved by a image output device for printing halftone densities on a medium by dot-concentrated screen or line screen that occur in fixed frequencies or by area changes in random dot screen, which are each formed by a plurality of pixels, and in this image output device, there may be provided a test chart where continuous areas in a tone pattern continuously changing in density and reference areas with a fixed density for density comparison with the continuous areas are output. This test chart may include a highlight proof part where the reference areas are reproduced in the color of a medium as it is, a shadow proof part where the reference areas are reproduced in the highest density, and a middle proof part where the reference areas are reproduced with a density different from that of the continuous areas, and calculating means for calculating a tone correction table for a printer from rising tone values obtained from an output result, on the medium, of the test chart data, and fading tone values of the shadow proof part, and most undistinguishable halftone values in the middle proof part, wherein the halftone reproduction characteristics of the image output device may be modified based on tone correction table values calculated by the calculating means.

In the calibration method, the calculating means may be supplied as utility software of the host PC.

In the calibration method, the calculating means of the tone correction table may use a color difference $\Delta E$ with respect to a printing medium in evaluation of density.

The image output device for printing halftone densities on a medium by dot-concentrated screen or line screen that occur in fixed frequencies or by area changes of random dots, which are each formed by a plurality of pixels, may provide image output including tone patterns changing in density in steps and reference density patterns with binary dots or line patterns each formed with density different from that of the tone patterns.

The test chart includes color data of at least two colors.

DETAILED DESCRIPTION OF THE EMBODIMENTS

Description will be made of a color laser printer, a color calibration method and a test chart used for this printer, all of which are embodiments of the present invention.

Figure 18:
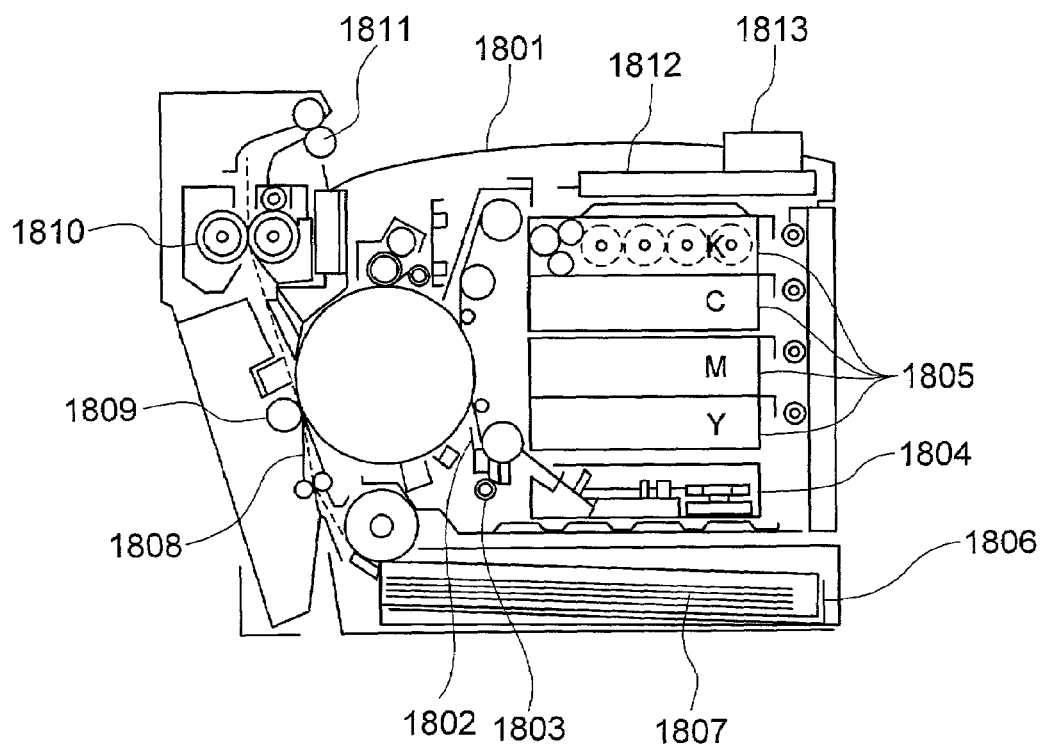
FIG. 18 is a longitudinal section for showing the outline of general structure of a color laser printer according to the embodiment of the present invention.

Referring to FIG. 18, description starts with the general structure of the color laser printer as an embodiment of the present invention. FIG. 18 is a longitudinal section schematically showing the general structure of a color laser printer according to an embodiment of the present invention. In FIG. 18, a print output part of a color laser printer 1801 includes a photosensitive body belt 1802, a belt drive motor 1803 for driving the photosensitive body belt 1802, a scanning exposure unit 1804 for forming a electrostatic latent image on the belt surface by having the belt 1802 exposed to light, and a developing unit 1805 for forming toner images of respective colors by developing the latent image. The developing unit 1805 contains four devices corresponding to four colors, cyan (C), magenta (M), yellow (Y) and black (K). The scanning exposure unit 1804 generates a laser beam from laser light output from semiconductor laser and radiating the laser beam to the belt 1802. An electrostatic developed image is transferred to a transfer drum 1808, and again transferred to paper 1807 as an output (print) medium sent from a cassette 1806 and passed between the transfer drum 1808 and a transfer roller 1809. The paper 1807 to which the developed image has been transferred is conveyed to a fixing unit 1810 where the toner image is fixed, and the paper is ejected by an ejection roller 1811 to the outside of the printer.

In the developing unit 1805, different kinds of toner are used to develop C, M, Y and K images and the respective developing functions are turned on and off by the controller 1812. In this embodiment, this controller 1812 controls the drive of the drive motor 1803, the scanning exposure unit 1804, the transfer drum 1808 and the fixing unit 1810. The controller 1812 further contains an image buffer (memory), a 4-color separation circuit and a tone correction circuit, which will be described later. As will be discussed later, the controller 1812 contains or has connected thereto data that the user needs for calibration an input interface 1813 for receiving information.

The color laser printer according to the present embodiment performs color printing by superposing four colors Cyan (C), Magenta (M), Yellow (Y) and blacK (K) by four processes, one process for each color plate, with a resolution of 23.6 dot/mm (600 dots per 25.4 mm).

Figure 1:
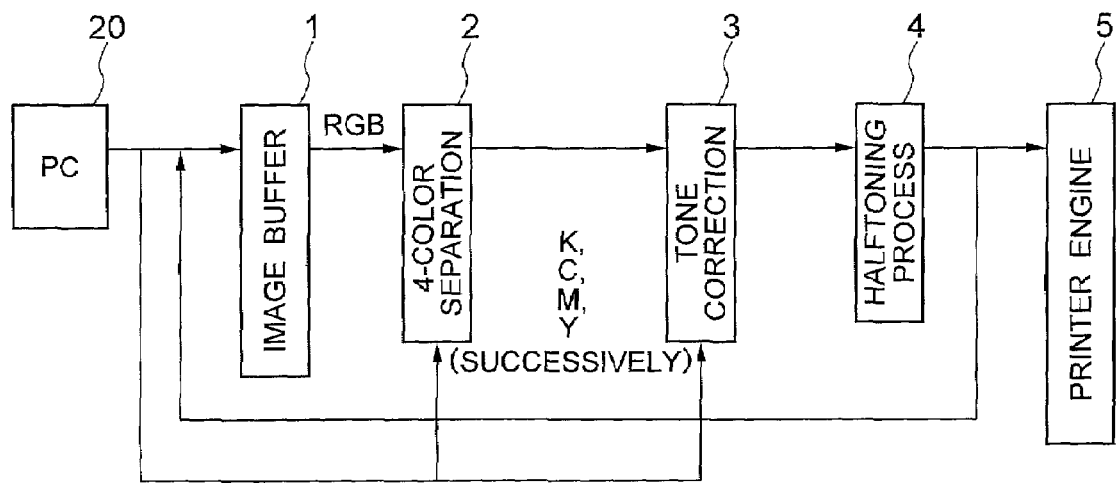
FIG. 1 is a flowchart of an image process in a color laser printer to which the present invention is applied.

FIG. 1 schematically shows the flow of the image process on this color laser printer.

In FIG. 1, in the first process, the 4-color separation circuit 2 generates 8-bit data of black (K) from image data of the image buffer 1 as an array of R. G and B values of 8 bits (256 tones), corresponding to the ink colors, sent by the host PC 20. Note that the 4-color separation circuit 2 here is capable of selecting either the standard black data synthesis process (standard black substitution) designed in advance or complete black substitution, which replaces the common quantities of C, M and Y by black K 100% in response to an instruction from the host PC 20.

The subsequent tone correction circuit 3 corrects the tone reproduction characteristics, and the tone process circuit 4 converts 8-bit data into binary data. The printer engine 5 develops an image of a black plane inside it from this binary data. The tone correction circuit 3 is adapted to be able to choose to let data pass without processing it by an instruction from the host PC 20. The tone correction circuit 3 can holds lookup table data necessary for tone correction by downloading it from the host PC 20. In the next process, the 4-color separation circuit 2 generates 8-bit data for Cyan similarly from data of the image buffer 1. The subsequent step same as mentioned above is repeated. After the above process is repeated four times, that is, once for each of K, C, M and Y, the printer engine 5 outputs a full color image by four color plates, C, M, Y and K, on paper.

To obtain binary data by the tone process circuit 4 in each of those processes, a method is often used, which arranges dots in sets of dots and varies the dot ratio according to levels of tone as disclosed in JP-A-2000-004359.

Figure 2:
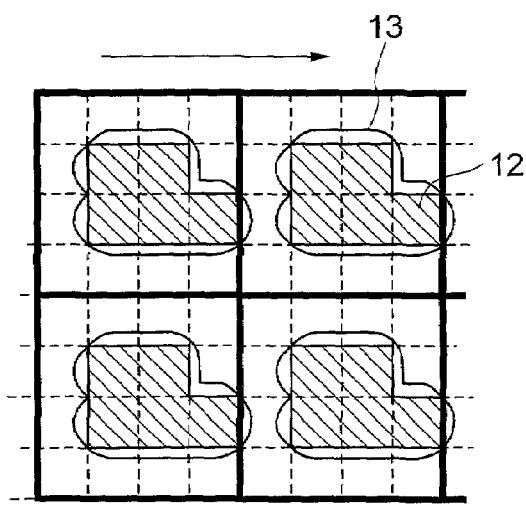
FIG. 2 is a conceptual diagram of dot gain in the tone process.

FIG. 2 is an enlarged diagram conceptually showing dot images in basic halftone cells of 4×4 recorder grids (spots).

In FIG. 2, the arrow shows the scanning direction of the laser and the hatched areas show specified logical printing areas. The minimum squares marked off by broken lines show spot widths (logical values) as basic printing units for printers.

Though the logical dot ratio in this case is 5/16 (=31%), as shown in the real printing area 13, as the laser spot scans in such a manner that more than covers the specified printing areas 12, the real printing areas 13 are wider than the specified printing areas 12. Therefore, the density value actually obtained is higher than a specified tone value 5/16. This expansion of printed areas is known as dot gain.

The size of dot gain depends on the circumferential length per unit area of a dot formed as well as the excessive swell of the laser spot and the development characteristics.

Figure 3:
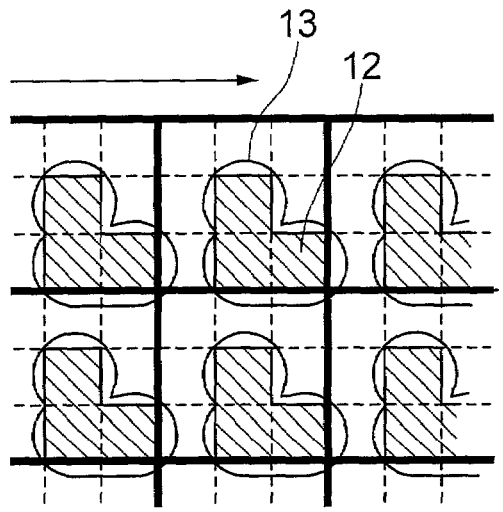
FIG. 3 is a conceptual diagram of dot gain in the tone process.

FIG. 3 is a conceptual diagram of tone expression, like in FIG. 2, by dots formed within halftone cells (basic arrays of spots) made up of 3×3 spots.

In FIG. 2, the specified logical value (area value) of tone is 5/16 (=31%), and the circumferential length (l) of the specified printing area 12 is l=10 in the area S=4×4=16 spots when the counting unit is the spot width. On the other hand, in the-example of FIG. 3, the specified value of tone is 3/9 (=33%) and the circumferential length l=8 in the area S of 3×3=9 spots. Therefore, it is understood that the dot circumferential length l/S per unit area is 8/9 in FIG. 3 where the dot density is higher than 10/16 in FIG. 2.

The relations mentioned above are shown in the graph of FIG. 4.

Figure 4:
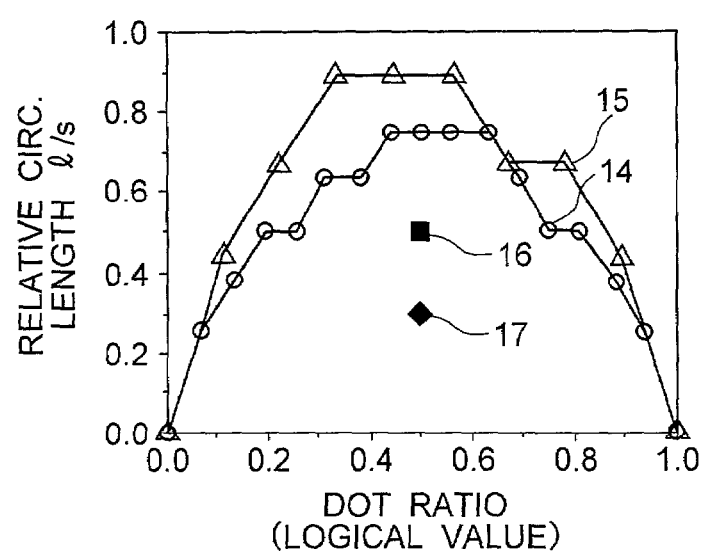
FIG. 4 is a graph for explaining changes in dot circumferential length per unit area with respect to dot ratio.

In FIG. 4, the horizontal axis represents the logical dot ratio corresponding to specified tone values, while the vertical axis represents relative values derived from dividing the dot circumferential length l by the number of spots S in a halftone cell, in which dots are formed, where the counting unit is the spot width. The mark ○ 14 indicates a relative circumferential length l/S=4×4 spots within a basic halftone cell. The mark Δ 15 indicates a variation of a relative circumferential length l/S, in a halftone cell of S=3×3 spots, with respect to the dot ratio.

According to findings by the present inventors, there is a correlation between dot gain and relative circumferential length l/S such that as the relative circumferential length l/S increases, dot gain increases accordingly. In this respect, it will be seen from FIG. 4 that real density is higher in halftones than in logical tones. Meanwhile, in a dot pattern using dots large in size and less in number, relative circumferential length is shorter than in a dot pattern with a greater number of dots. Consequently, dot gain is less liable to be affected by changes in the development characteristics due to changes or aggravation in environmental conditions, such as temperature and humidity.

More specifically, the present embodiment provides a calibration method using a test chart that adopts the above-mentioned stable dot pattern in which a relative circumferential length is short with respect to a printed area ratio, a fact which is effective in reducing dot gain, and realizes a more stable dot pattern subject to lesser changes in dot gain regardless of changes in environmental conditions.

Figure 5A:
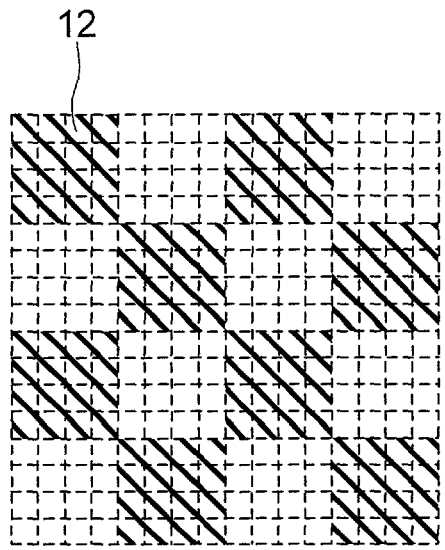
FIG. 5 is an example of a pattern with small relative circumferential length.
Figure 5B:
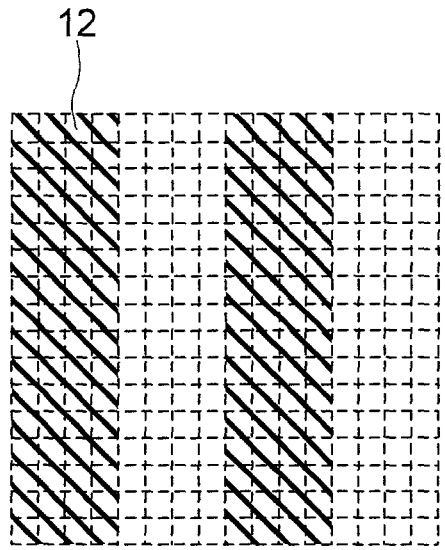

For such a dot pattern, in this embodiment, two patterns shown in FIGS. 5A and 5B are used. The mark ■ 16 in FIG. 4 denotes a checkered pattern shown in FIG. 5A and the mark ♦ 17 denotes a parallel line pattern shown in FIG. 5B. By observing those points shown in FIG. 4, it is understood that the patterns in FIGS. 5A and 5B are effective in reducing the relative circumferential length and therefore dot gain.

In FIG. 5A, a checkered pattern includes hatched dot areas each consisting of one or more squares and unhatched areas each consisting of one or more squares, or areas high in density and areas low in density, or areas high in lightness and areas low in lightness, or areas high in saturation and areas low in saturation. In this checkered pattern, a plurality of hatched dot areas and a plurality of unhatched areas are alternately arranged in the vertical and horizontal directions. The hatched dots being continuous in the vertical or horizontal direction reduces the circumferential length and therefore reduces the relative circumferential length l/S.

In FIG. 5B, the vertical hatched belts recur at fixed intervals in the horizontal direction of the drawing. On the other hand, the hatched dot areas and the unhatched areas are arranged continuously in the vertical direction, thus forming a so-called line screen pattern.

In either of those patterns, the dots with high density, lightness, or saturation, which are arranged in the vertical or horizontal direction, have a shorter circumferential length, and the relative circumferential length of dots to be printed is made shorter with respect to a specified printed area ratio. By using those patterns, density, lightness or saturation can be securely achieved as planned by reducing environmental effects on dot gain.

Description will now move to a method of performing calibration by deciding tone reproduction characteristics by using either of the patterns in FIGS. 5A and 5B.

Figure 6:
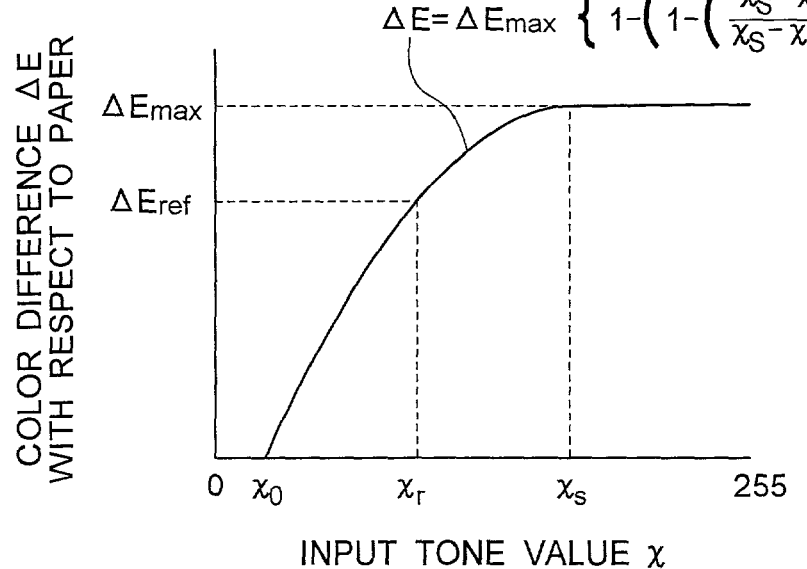
FIG. 6 is a graph showing color-difference tone reproduction characteristics with respect to input tone values.

FIG. 6 shows an example of tone reproduction characteristics of a printer when tone correction in FIG. 1 is not performed.

In FIG. 6, the horizontal axis represents input tone values x of 8 bits (256 tones) and the vertical axis represents, instead of density, CIE 1976 color differences ΔE with respect to white color on paper under illumination D50 specified by Commission Internationale de l'Eclairage (CIE). The reason for adopting the color difference instead of density is that the representation of color difference with the vision characteristics taken into consideration is more suitable for visual calibration of the tone reproduction characteristics of colors.

In the tone process in this embodiment, like in JP-A-2000-004359, in addition to the dot process as shown in FIG. 2, a process of subdividing the laser pulse width for one dot or a process of dispersing increasing dots is also performed to increase the number of tones.

Therefore, as shown in FIG. 6, in a range of input tone values from 0 to x0, a variation in potential by laser exposure does not exceed the development threshold value, so that there is a range where printing does not take place at all (ΔE=0). Because of dot gain mentioned above, in an intermediate range from input tone value x0 to xs, the tone reproduction characteristics become convex upward and then saturates in the range from xs to a tone value 255.

A model can be made of the tone reproduction characteristics by the following formula.

$$\Delta E = \Delta E\ \max\left\{1 - \left[1 - \left(\tfrac{x_s - x}{x_s - x_o}\right)\right]^{\gamma}\right\} \qquad (1)$$

In this model, x0 is hereafter referred to as highlight offset and xs as a saturation tone value. To characterize the tone reproduction characteristics by this equation (1), it is only necessary to determine values of x0 and xs, a value of ΔEmax (maximum value of ΔE) and a value of γ. However, parameters for x0, xs and γ are redundancy and, above all, the value of γ tends to be unstable depending on what value is to be set for xs. For this reason, in the present invention, a value of γ is determined by using ΔE value of a reference pattern (ΔEref) decided by the method shown in FIG. 6 and its corresponding input tone value xr.

Figure 7:
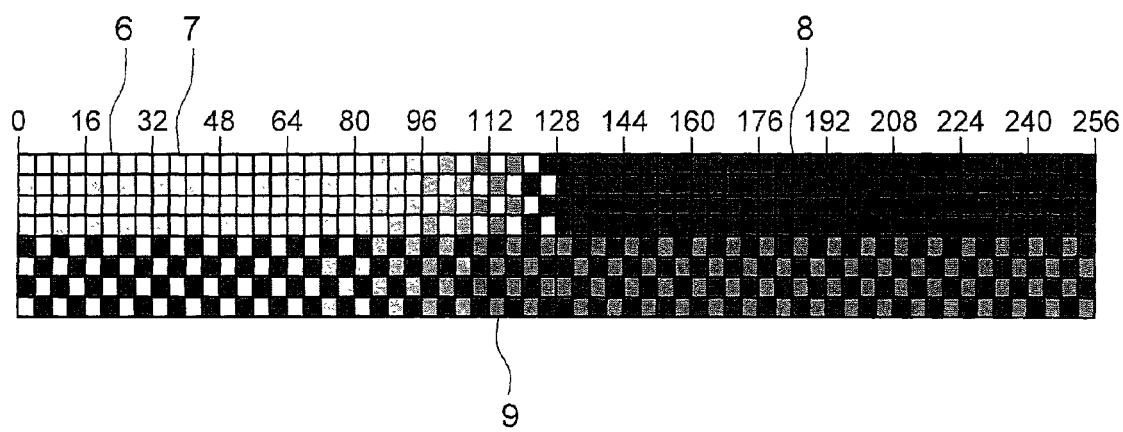
FIG. 7 is a diagram showing a basic structure of test chart data.

FIG. 7 shows an example of image data for a test chart used for calibration according to the present invention.

In FIG. 7, this test chart is applicable to color plates of C, M, Y and K, but for convenience's sake, description will be made supposing a case where the chart is used for a single color of black (K).

Figure 8:
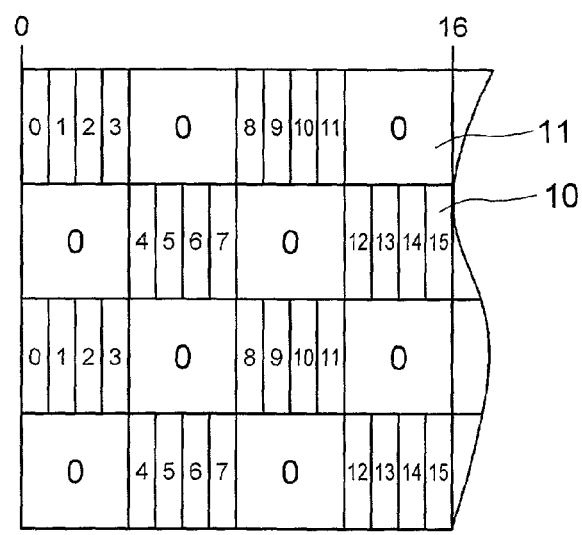
FIG. 8 is a diagram for explaining the highlight proof part of test chart data.
Figure 9:
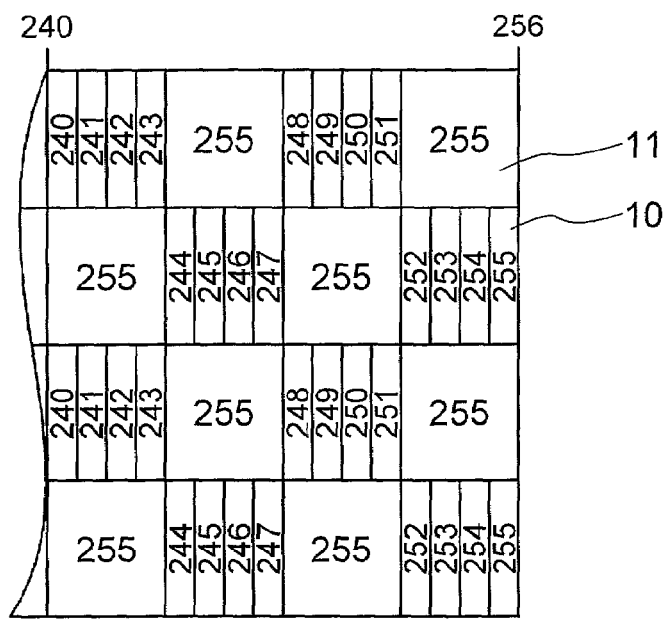
FIG. 9 is a diagram for explaining the shadow proof part of test chart data.
Figure 10:
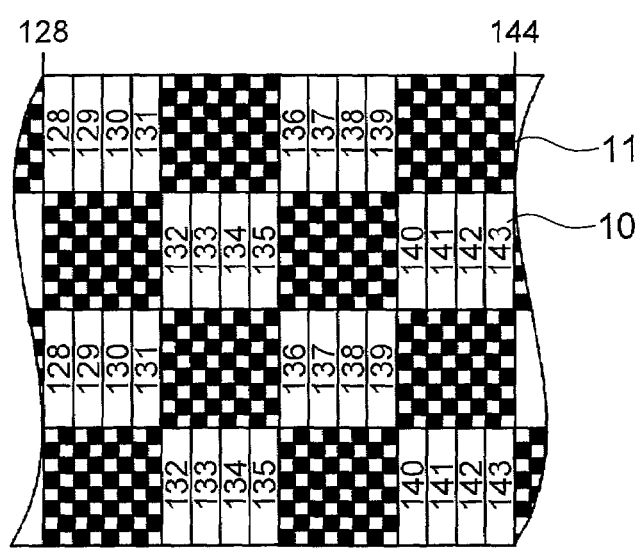
FIG. 10 is a diagram for explaining the middle proof part of test chart data.

The test chart 6 comprises a highlight proof part 7, a shadow proof part 8 and a middle proof part 9. As detail is shown in FIGS. 8 to 10, each of those proof parts has printed thereon continuous areas (tone-changing areas) 10, which change in tone in steps or continuously, and reference areas (tone-fixed areas) 11 having a printed predetermined tone value by which to determine the tone values of the continuous areas 10 through tone comparison with the reference areas 11. Each type of proof part has arranged thereon the continuous areas 10 alternating with the reference areas 11 in the vertical or horizontal direction of the drawing.

FIG. 8 is a detail diagram of the highlight proof part 7.

In FIG. 8, the values are tone values specified to the respective areas. The tone value 0 corresponds to white, and the tone value 255 corresponds to black as the maximum density. As shown in FIG. 8, the highlight proof part 7 has a checkered pattern consisting of the continuous areas 10 increasing in tone from the white ground of paper with nothing printed on it up to halftones, and the reference areas 11 of white with the white ground of paper as a print medium, in which the areas 10 and 11 are alternately arranged.

FIG. 9 is a detail diagram of the shadow proof part 8.

In FIG. 9, the shadow proof part 8 has a checkered pattern for proof on which there are arranged the continuous areas 10 increasing in tone in steps from halftones and close to the maximum tone, which, as in FIG. 8, alternate with the reference areas 11 of black as the maximum density (or saturation or lightness).

In the middle proof part 9 in FIG. 10, as in FIGS. 8 and 9, the reference areas 11 are printed in a pattern of FIG. 5A or 5B. More specifically, the tones of the continuous areas 10 are arranged in such a way that the dot-continuing areas alternate with the no-dot areas in the horizontal direction (a direction in which the tones of the continuous areas 10 change) or in the vertical direction (a direction that is at right angles with the tone-changing direction of the continuous areas 10) in order to print an image at a specified printed area ratio with density, saturation and lightness as intended.

Figure 11:
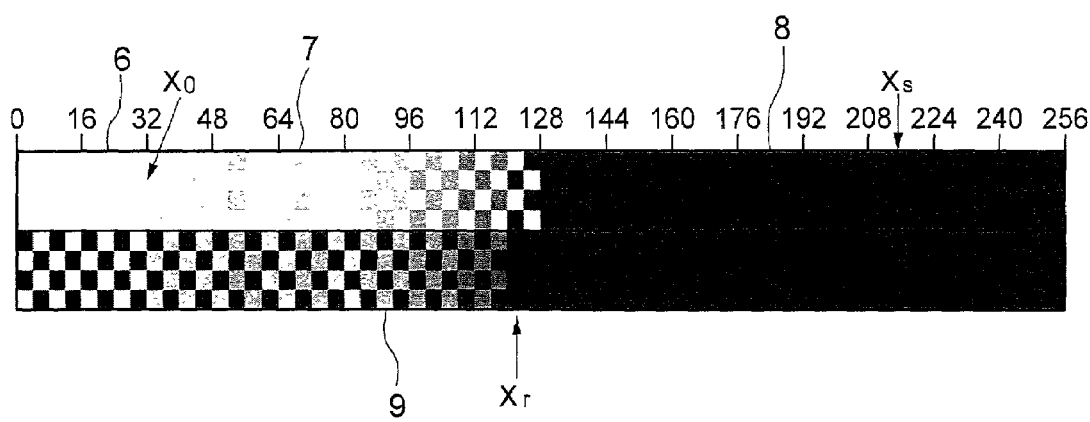
FIG. 11 is a diagram for explaining a test chart output result.

An image output for test image data is produced by the tone process circuit 4 in FIG. 1 as shown in FIG. 11. Because of difficulty of accurate illustration in printing a diagram, only a conceptual diagram is shown in FIG. 11.

In FIG. 11, highlight offset is read at position x0 from which the check pattern of the highlight proof part 7 begins to come into view. In other words, in the highlight proof part 7, when a tone difference between the printed pattern for calibration and the white ground as the color of a print medium substrate becomes larger than a specified value and the check pattern becomes visually distinguishable or, conversely, when a tone difference becomes small and the check pattern becomes undistinguishable, the tone value of the continuous areas 10 is read. Similarly, in the shadow proof part 8, where the check pattern comes to fade away, the saturation tone value xs is read. In other words, in the shadow proof part 8, when a tone difference between the printed pattern for calibration and a color of maximum density, saturation or lightness that can be output by the printer becomes larger than a specified value and the calibration pattern becomes distinguishable or, conversely, when the tone difference becomes small and the calibration pattern becomes undistinguishable from the reference areas, the tone value of the continuous areas 10 is read. Further, in the middle proof part 9, a halftone value such that the color difference (density difference) from the reference areas is at minimum is read as the value xr at which the check pattern is least conspicuous on the middle proof part 9. In other words, the xr is the tone value at the border where a difference in density, saturation or lightness between the continuous areas 10 and the reference areas 11 of a predetermined tone becomes either distinguishable or undistinguishable.

Description will now be made of the method of obtaining a value of in the model expressed by equation (1) from the readout value xr in the middle proof part 9.

Figure 12:
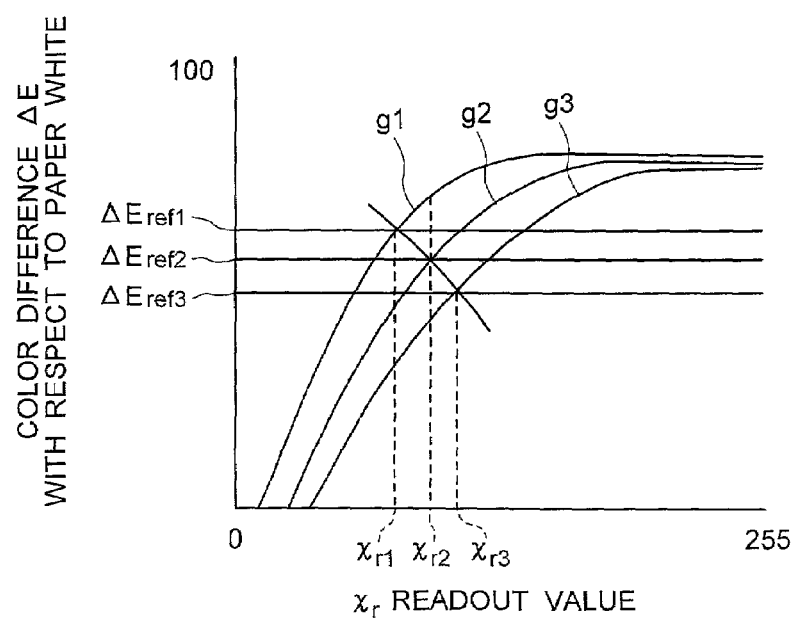
FIG. 12 is an example of a graph showing relation between changes in tone reproduction characteristics and intermediate readout values.

In FIG. 12, curves g1, g2 and g3 show the tone reproduction characteristics of the printer under different developing conditions when tone correction is not carried out. g1 denotes a condition of maximum density. A ΔE value of the reference areas 11 in the middle proof part 9 corresponding to this g1 condition is ΔEref1. Similarly, a ΔE value of the reference areas 11 in the middle proof part 9 corresponding to a standard density condition g2 is ΔEref2, and a ΔE value of the reference areas 11 in the middle proof part 9 corresponding to a standard density condition g3 is ΔEref3. From their intersections in the graph, the relation between xr readout values and ΔEref is obtained.

Figure 13:
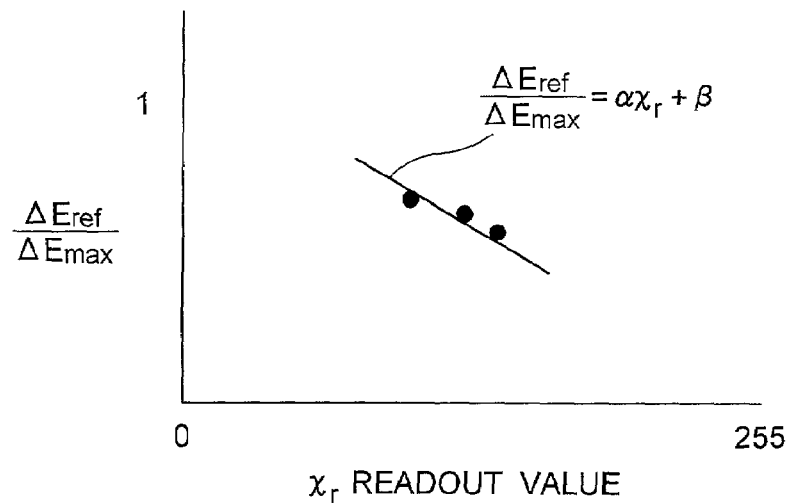
FIG. 13 is an example of a graph showing relation intermediate readout values and $\Delta Eref/\Delta Emax$.

In the color laser printer in this embodiment, because the relation between xr readout values and ΔEref/ΔEmax for each color C, M, Y and K is approximately linear as shown in FIG. 13, the relation can be approximated to an equation as follows.

$$\gamma = \frac{\log\left[1 - \left(\frac{\Delta Eref}{\Delta E \max}\right)\right]}{\log\left[1 - \left(\frac{x_s - x_r}{x_s - x_0}\right)\right]} \quad (2)$$

From the above equation (2) and equation (3)

$$\frac{\Delta Eref}{\Delta E \max} = \alpha x_r + \beta \quad (3)$$

obtained by solving equation (1) for γ, we have a presumed formula for γ

$$\gamma = \frac{\log[1 - \alpha x_r - \beta)}{\log\left[1 - \left(\frac{x_s - x_r}{x_s - x_0}\right)\right]} \quad (4)$$

Because the ΔEmax as a solid area property is relatively easy to stabilize by controlling the printer engine, by empirically finding constants α and β in equation (4) for each color in advance, the tone reproduction characteristics of colors C, M, Y and K are determined using equations (4) and (1) from three values of x0, xs and xr that can be obtained visually from output of the test chart 6.

In tone correction in the tone process circuit 4 in FIG. 1, a value of γ is obtained from the three values of x0, xs and xr, which have been obtained previously for each color, and by correcting the tones from equation (5)

$$x' = 255\left[x_s - (x_s - x_0)\left\{1 - \frac{x}{255}\right\}^{\gamma-1}\right] \quad (5)$$

the tone reproduction characteristics of an image output from the printer engine can be finally linearized. Needless to say, if linear tone reproduction characteristics are obtained, by combining the linear tone reproduction characteristics with an optional characteristic function, the linear tone reproduction characteristics can be easily transformed into other tone reproduction characteristics.

Figure 14:
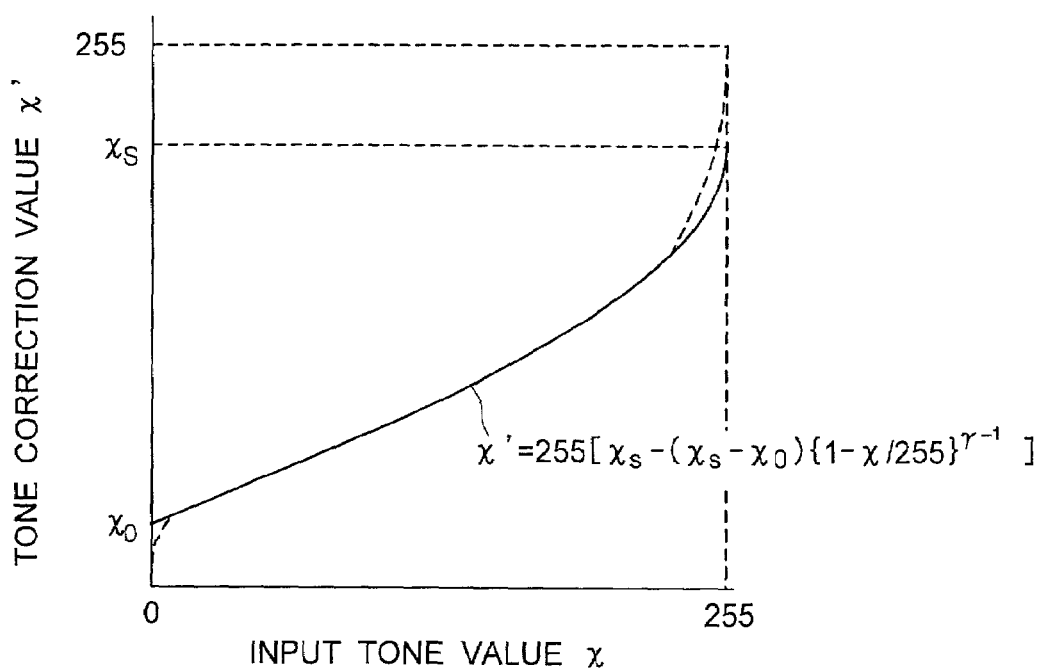
FIG. 14 is a graph of a tone correction function to linearize the tone reproduction characteristics.

FIG. 14 is a graph of a tone correction function corresponding to equation (5).

In FIG. 14, the solid line corresponds to equation (5), but given some variation in the characteristics, it is effective to make the curve round at both ends as shown by broken lines for the highlight part 14 and the shadow part 15. By this modification, it is possible to preclude irregularities, such as fog, even if the highlight offset x0 becomes smaller while the printer is in operation or prevent a jump in tone in the shadow part due to a variation in the saturated tone value xs In the above description, description has been made centering on calibration related to a black test chart simply for ease of explanation. For a color printer of four colors of C, M, Y and K, needless to say, it is convenient if the test chart 6 is capable of printing test charts of C, M, Y and K simultaneously.

Figure 15:
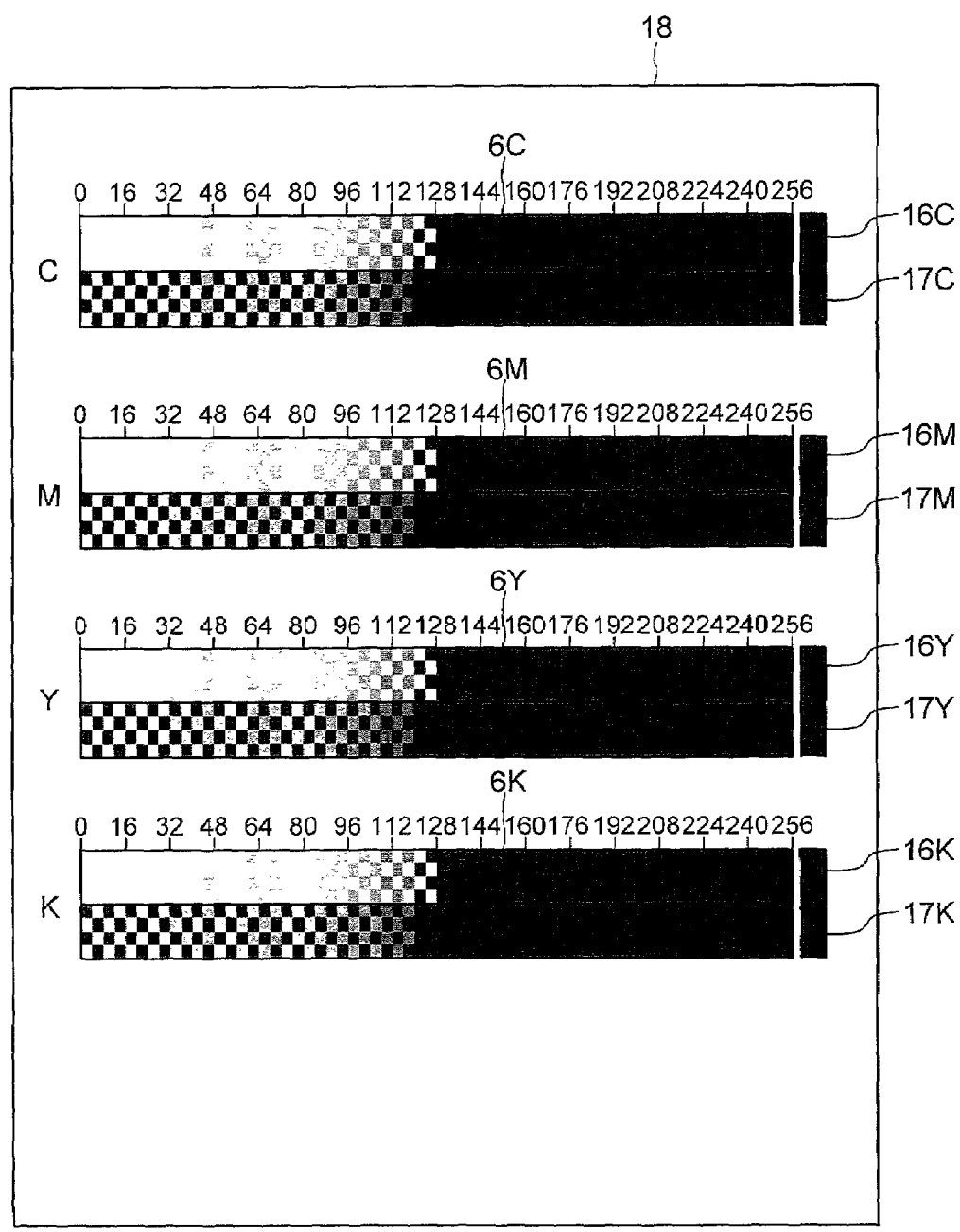
FIG. 15 is an example of a test chart for simultaneous calibration of CMYK.

FIG. 15 shows an example of arrangement of test charts of four colors C, M, Y and K.

In FIG. 15, a test chart 18 comprises a Cyan test chart 6C corresponding to the test chart 6 in FIG. 7, and a Cyan maximum tone colorimetry patch 16C adjacent to the test chart 6c and a Cyan reference tone colorimetry patch 17C. It goes without saying that the reference tone colorimetry patch 17C is printed in the same pattern as the reference areas 11 in the middle proof part 9 of the test chart 6c.

Similarly, a Magenta test chart 6M, a Magenta maximum tone colorimetry patch 16M, and a Magenta reference tone colorimetry patch 17M, a Yellow test chart 6Y, a Yellow maximum tone colorimetry patch 16Y, and a Yellow reference tone colorimetry patch 17Y, a Black test chart 6K, a Black maximum tone colorimetry patch 16K, and a Black reference tone colorimetry patch 17K are provided.

Thus, instead of approximation by the model in equation (3), it becomes possible to perform accurate colorimetry of ΔEmax and ΔEref by a colorimeter, and it is also possible to estimate tone reproduction characteristics using ΔEref/ΔEmax by measured values. In this case, too, a required number of colorimetry is a total of nine colors, including the white ground of paper, ΔEmax and ΔEref of each of C, M, Y and K. This makes it possible to estimate relatively accurate tone reproduction characteristics without using a large-scale automatic colorimetry stage.

With regard to the Yellow test chart 6Y, generally, there is difficulty in distinguishing the pattern, but this problem can be solved easily by using a simple Blue-color film in observation of the pattern.

As an alternative solution, with the Yellow test chart, it is only necessary to print Cyan of the common density on the substrate of paper before printing a Yellow test chart. This precludes the above-mentioned difficulty in observation.

In this case, the Yellow test chart appears to be Green, but this test chart can be used as the proper means for calibration of Yellow. By printing Magenta of the common density on the paper substrate, a similar effect can be achieved, but the use of Cyan makes observation easier.

Figure 16:
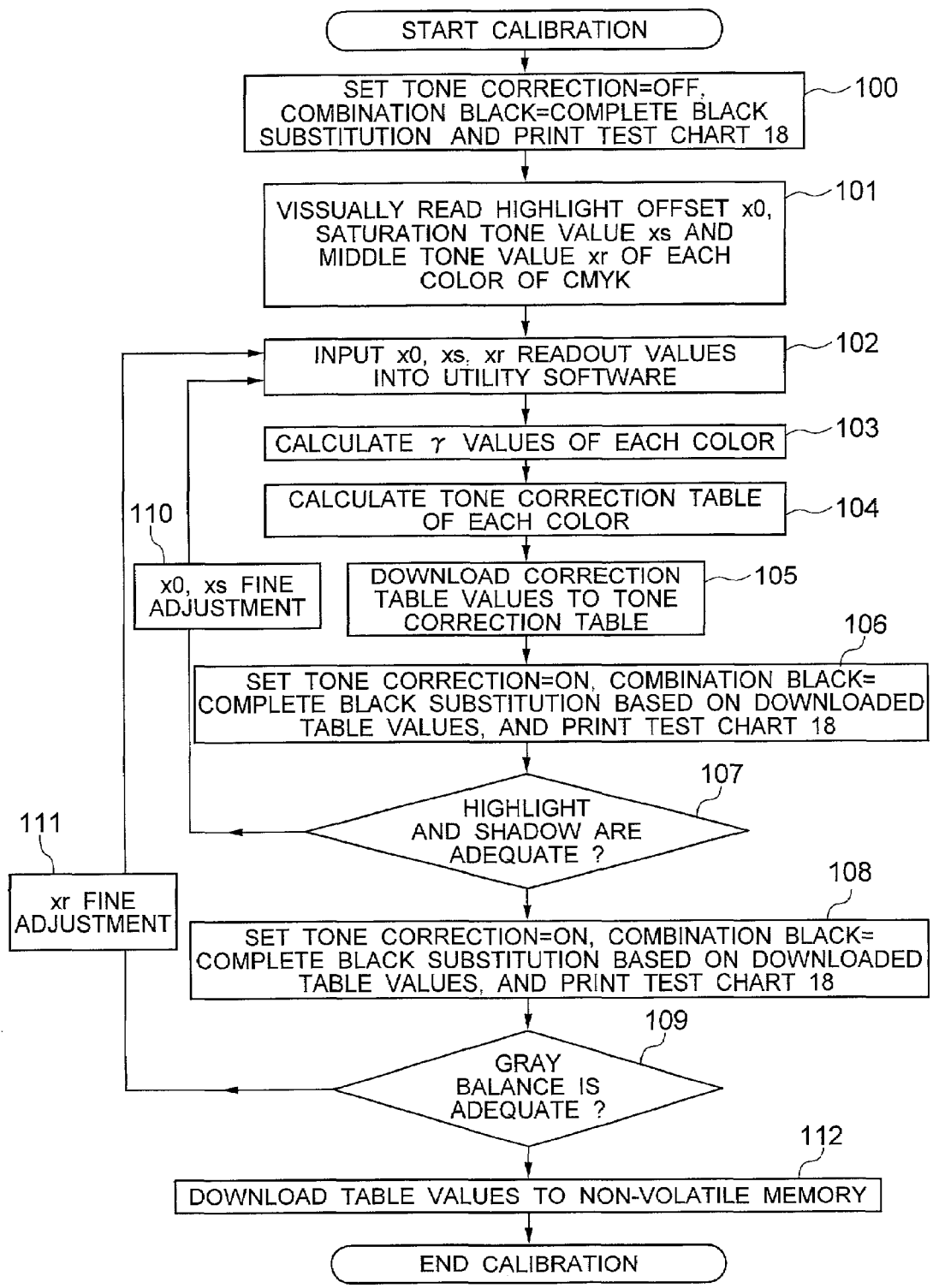
FIG. 16 is a flowchart for explaining the calibration method according to the present invention.

FIG. 16 is a flowchart for explaining an ordinary calibration procedure using a test chart 18.

In FIG. 16, in the first step 100, the tone correction circuit 3 is deactivated, the 4-color separation circuit 2 is instructed to perform complete black substitution and print a test chart 18. The Black test chart 6K in the test chart 18 is formed with data of C=M=Y indicating equal tone values of C, M and Y. By complete black substitution, these data are reproduced with a single color of Black by setting as C'=M'=Y'=0 and K'=C.

In step 101, from a test chart 18 output, the highlight offset x0, the saturated tone value xs and the halftone value xr are read visually for each of C, M, Y and K, and in step 102, the readout values are input to the utility software on the host PC.

In step 103, the utility software calculates γ values of each of C, M, Y and K from equation (4) by using constants α and β empirically determined in advance for each of C, M, Y and K from the x0, xs and xr values of each of C, M, Y and K input by the user.

The utility software in step 104 calculates a tone correction values x' in equation (5) for each of x=0 through 255 by using the x0, xs and γ values of each of C, M, Y and K, and thereby generates a lookup table for tone correction of C, M, Y and K, and in step 105, this table is downloaded to the tone correction circuit 3.

With regard to the table mentioned above, data input by the user may be sent to a program server on the network, results by calculations by a program on the server may be transmitted to printers or image output devices of users and then downloaded to the tone correction circuit 3 or the storage device.

In step 106, tone correction is carried out based on the values downloaded to the tone correction circuit 3, and the 4-color separation circuit 2 is kept in the state, as has been instructed, to perform complete black substitution and prints a test chart 18.

With regard to printed results, in step 107, checks are made of each of C, M, Y and K to make sure that there is not blushing on the highlight, or that highlight offset does not remain, that the check pattern is observable up to the vicinity of the corners (level 255) of the shadow, and that the shadow-part pattern has not become unidentifiable before the tone reaches level 255. The highlight offset value x0 and the saturated tone value x1 are corrected for a specified color if necessary, and steps from step 102 are repeated. When it has been confirmed in step 107 that the highlight and the shadow became adequate, in step 108, the tones are corrected, and the 4-color separation circuit 2 is instructed to switch to standard black substitution, and print a test chart 18.

In step 109, special attention is directed to the middle proof part 9 of the Black test chart 6K. In black substitution in this embodiment, because even in standard black substitution, black fonts are printed in a single black color, setting has been made so that C=M=Y=0 and K=255 are output when C=M=Y=255 is input. For this reason, the continuous areas 10 in the Black middle proof chart 9 are reproduced in a mixed color of C, M, Y and K, and the reference areas 11 are reproduced in a single color of K. Therefore, any shift in color balance can be observed easily in the Black middle proof part 9 in output result of the test chart 18 in step 108.

This observation is performed in step 109. For example, if a mixed color of black appears to be bluish, it is decided in step 111 that Yellow as a complementary color of Blue is deficient, the halftone value xr of Yellow specified in step 102 is corrected a little. Conversely, if Yellow is excessive, the xr value is corrected to a great degree, and steps from step 102 are repeated. However, in correction in this case, because the highlight and the shadow have been made adequate, it is almost unnecessary to repeat step 107. With regard to color balance of other colors, by similar fine adjustment, the gray balance can be adjusted in a very fine degree.

By the process mentioned above, if color calibration by the visual test chart 18 has been accomplished, by step 112 the tone correction table values are downloaded to the nonvolatile memory in the tone correction circuit 3, with which calibration is finished.

Figure 17:
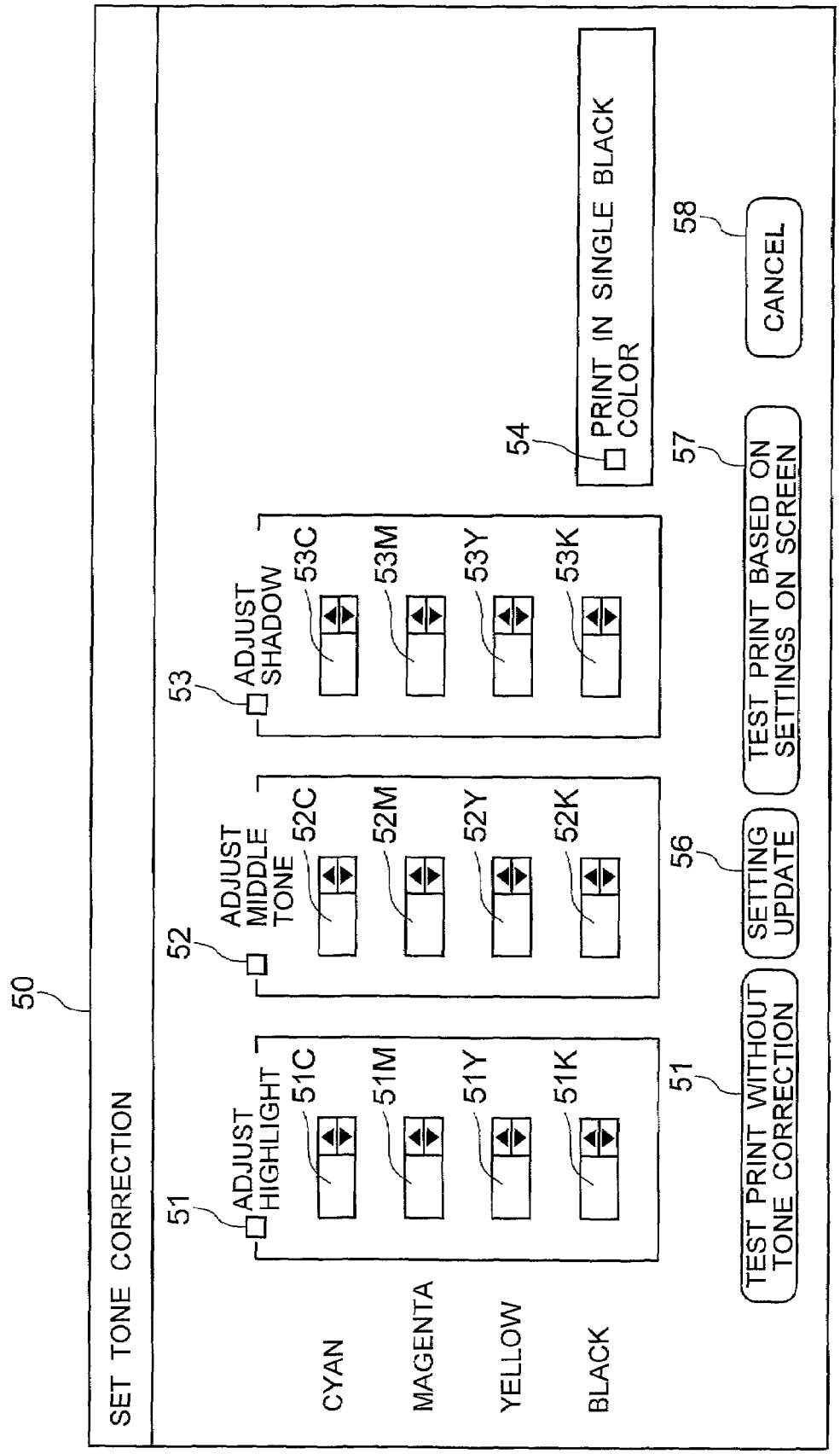
FIG. 17 is a diagram of user interface of utility software supporting user calibration.

FIG. 17 shows an example of a user interface 50 of utility software that supports color calibration, which has been described.

In FIG. 17, when check box 54 is checked, an instruction is issued to the 4-color separation circuit 2 to perform complete black substitution. By this action and a button 55, a test chart 18 necessary for step 100 is printed.

Further, when a check box 51 is checked, it becomes possible to input the highlight offset value x0 in step 102 to the input interfaces 51C, 51M, 51Y and 51K for colors C, M, Y and K. Similarly, when a check box 52 is checked, the halftone value xr in step 102 can be input to the input interfaces 52C, 52M, 52Y and 52K for colors C, M, Y and K. When a check box 53 is checked, the saturated tone value xs in step 102 can be input to input interfaces 53C, 53M, 53Y and 53K for colors C, M, Y and K. If the check boxes 51 to 53 are not checked, default values at shipment from the factory are specified for the parameters, Pressing a button 57 prints a test chart 18 in which the user's setting values necessary for steps 106 and 108 are reflected.

The tone correction table, which is downloaded in step 105, is volatile and needs to be provided each time a Print instruction is issued. However, by pressing a button 56, the tone correction table is written in a non-volatile memory of the tone correction table 3, and is referenced continuously in subsequent printing operations.

By the arrangements mentioned above, three distinctive tone values, can be obtained visually, the three distinctive tones being a tone value at which dots begin to appear in the highlight of each color (highlight offset), a limiting tone value at which the tone saturates (saturation tone value), and a tone value at which the shade of color is most agreeable with that of the reference pattern by visual perception (halftone value).

The calculating means, referring to the three tone values, estimates tone reproduction characteristics of $\Delta E$ with respect to a printing medium (paper in most cases), and decides tone correction values.

Thus, for general users without any high-level calorimetric machine, it becomes possible to perform simple calibration of tone reproduction characteristics by visual inspection of a test chart printed out by a color printer on the spot.

As has been described, a test chart and a tone correction table calculating means according to the present invention make a method of calibrating tone reproduction characteristics in a color laser printer available to users in general who do not use a high-level calorimeter.

Further, in such a case where high precision proof is carried out by measuring $\Delta E_{max}$ and $\Delta E_{ref}$ of each color with a calorimeter, if the method according to the present invention is used, the required number of measurements is no more than nine, including $\Delta E_{max}$ and $\Delta E_{ref}$ of each of four colors, C, M, Y and K, and the white ground of paper, and a large-scale automatic calorimeter is not required. Resulting savings of time and labor are very large.

Thus, according to the present invention, there are provided a calibration method of a color laser printer in which simple calibration is performed of tone reproduction characteristics using a test chart that can be inspected visually and a test chart for a color printer that enables calibration with high precision.

What is claimed is:

1. An image output device for outputting a color of different tones on a medium, comprising;
    a function for outputting, on said medium, test chart data having tone-changing areas where a tone of a color output changes in steps arranged alternately with tone-fixed areas where a predetermined tone of said color is output;
    input means for accepting tone information from said test chart output; and
    adjusting means for adjusting output to said medium based on data for correcting said tone calculated from said tone information input.

2. A test chart produced by the image output device of claim 1, said test chart comprising:
    tone-changing areas wherein a tone of color output from the image output device changes in steps;
    tone-fixed areas wherein a predetermined tone of said color is output from the image output device;
    wherein said tone-changing areas are arranged alternately with said tone-fixed areas, and
    wherein tone values can be read when a tone difference between adjacent areas of said tone-changing areas and said tone-fixed areas is greater than a specified magnitude.

3. A test chart according to claim 2, wherein:
    a particular pattern is formed with said tone-changing areas and said tone-fixed areas;
    said particular pattern is visually distinguishable according to a tone difference between said tone-changing areas and said tone-fixed areas; and
    a tone value of said tone-changing areas at which said particular pattern becomes visually undistinguishable can be read.

4. A test chart produced by the image output device of claim 1, said test chart comprising:
    tone-changing areas wherein a tone of a color output from the image output device changes in steps;
    tone-fixed areas wherein a predetermined tone of said color is output from the image output device;
    a first proof part wherein said tone-changing areas are arranged alternately with said tone-fixed areas, and wherein said tone-fixed areas are output at a first tone that can be compared with tones of said tone-changing areas;
    a second proof part wherein said tone-fixed areas are output at a second tone greater than the first tone; and
    a third proof part wherein said tone-fixed areas are output at a tone between said first and second tones,
    wherein tone values having a difference in tone between adjacent pairs of said tone-changing areas and said tone-fixed areas greater than a specified magnitude can be read at each of said first, second, and third proof parts from results of test chart data output on the medium.

5. A test chart according to claim 4, wherein said tone-fixed areas of said third proof part are arranged alternately with tone-changeable areas of said tone-changing areas in a tone-changing direction of the tone-changing areas.

6. A test chart according to claim 4, wherein:
a particular pattern is formed with said tone-changing areas and said tone-fixed areas;
said particular pattern is visually distinguishable according to a tone difference between said tone-changing areas and said tone-fixed areas; and
a tone value of said tone-changing areas at which said particular pattern becomes visually undistinguishable can be read.

7. A test chart according to claim 6, wherein said tone-fixed areas of said third proof part comprise a halftone pattern having a different dot gain from that of said tone-changing areas.

8. A test chart produced by the image output device of claim 1, said test chart comprising:
tone-changing areas wherein a tone of a color output from the image output device changes in steps;
tone-fixed areas wherein a predetermined tone of said color is printed;
a first proof part wherein said tone-changing areas are arranged alternately with said tone-fixed areas, and said tone-fixed areas are output at a first tone;
a second proof part wherein said tone-fixed areas are output at a second tone greater than said first tone; and
a third proof part wherein said tone-fixed areas are output at a tone between said first and second tones,
wherein tone values having a difference in tone between adjacent pairs of said tone-changing areas and said tone-fixed areas greater than a specified magnitude can be read at each of said first, second, and third proof parts from results of test chart data output on the medium.

9. A test chart according to claim 8, wherein said tone-fixed areas of said third proof part are arranged alternately with tone-changeable areas of said tone-changing areas in a tone-changing direction of the tone-changing areas.

10. A test chart according to claim 8, wherein:
a particular pattern is formed with said tone-changing areas and said tone-fixed areas;
said particular pattern is visually distinguishable according to a tone difference between said tone-changing areas and said tone-fixed areas; and
a tone value of said tone-changing areas at which said particular pattern becomes visually undistinguishable can be read.

11. A test chart according to claim 10, wherein said tone-fixed areas of said third proof part comprise a halftone pattern having a different dot gain from that of said tone-changing areas.

12. A test chart produced by the image output device of claim 1, said test chart comprising:
tone-changing areas wherein a tone of a color output changes in steps;
tone-fixed areas wherein a predetermined tone of said color is printed;
a first proof part wherein said tone-changing areas are arranged alternately with said tone-fixed areas, said tone-fixed areas are output at a first tone;
a second proof part wherein said tone-fixed areas are output at a second tone corresponding to a greatest tone printable by a printer; and
a third proof part wherein said tone-fixed areas are output at a tone between said first and second tones;
wherein tone values having a difference in tone between adjacent pairs of said tone-changing areas and said tone-fixed areas greater than a specified magnitude can be read at each of said first, second and third proof parts from results of test chart data output on the medium.

13. A test chart according to claim 12, wherein said tone-fixed areas of said third proof part are arranged alternately with tone-changeable areas of said tone-changing areas in a tone-changing direction of the tone-changing areas.

14. A test chart according to claim 12, wherein:
a particular pattern formed with said tone-changing areas and said tone-fixed areas;
said particular pattern is visually distinguishable according to a tone difference between said tone-changing areas and said tone-fixed areas; and
a tone value of said tone-changing areas at which said particular pattern becomes visually undistinguishable can be read.

15. A test chart according to claim 14, wherein said tone-fixed areas of said third proof part comprise a halftone pattern having a different dot gain from that of said tone-changing areas.

16. An image output device according to claim 1, wherein said test chart data has a particular pattern that is visually distinguishable according to a tone difference between said tone-changing areas and said tone-fixed areas.

17. An image output device according to claim 16, wherein said particular pattern comprises a checkered pattern.

18. An image output device for outputting a color of different tones on a medium, comprising:
a function for outputting, on said medium, test chart data having tone-changing areas where a tone of a color output changes in steps arranged alternately with tone-fixed areas where a predetermined tone of said color is output, said test chart data comprising a first proof part where said tone-fixed areas are output at a specified first tone and can be compared with tones of said tone-changing areas; a second proof part where the tone-fixed areas are output at a second tone greater than the first tone and can be compared with tones of said tone-changing areas; and a third proof part where the tone-fixed areas are output at a tone between said first and second tones and can be compared with tones of said tone-changing areas; and
input means for accepting tone information on said first, second and third proof parts from the result of test chart data output on said medium, and
adjusting means for adjusting output on said medium based on data for correcting said tone calculated from said tone information input.

19. An image output device according to claim 18, wherein said tone-fixed areas of said third proof part of said test chart are arranged alternately with tone-changeable areas of said tone-changing areas in a tonechanging direction of the tone-changing areas.

20. An image output device according to claim 18, wherein said test chart data has a particular pattern that is visually distinguishable according to a tone difference between said tone-changing areas and said tone-fixed areas.

21. An image output device according to claim 20, wherein said tone-fixed areas of said third proof part of said test chart comprise a halftone pattern having a different dot gain from that of said tone-changing areas.

22. An image output device according to claim 21, wherein said tone-fixed areas of said third proof part comprises one of a checkered pattern and a parallel line pattern.

23. An image output device for printing a color of different tones on a medium, comprising:
- a function for outputting, on said medium, test chart data having tone-changing areas where a tone of a color to be printed changes in steps arranged alternately with tone-fixed areas where a predetermined tone of said color is printed, said test chart data comprising a first proof part where said tone-fixed areas are output at a first tone as a tone of a color of said medium and can be compared with tones of said tone-changing areas; a second proof part where the tone-fixed areas are output at a second tone greater than the first tone and can be compared with the tones of said tone-changing areas; and a third proof part where the tone-fixed areas are output at a tone between said first and second tones and can be compared with the tones of said tone-changing areas;
- input means for accepting tone information on said first, second and third proof parts from the result of test chart data output on said medium; and
- adjusting means for adjusting output on said medium based on data for correcting said tone calculated from said tone information input.

24. An image output device according to claim 23, wherein said tone-fixed areas of said third proof part of said test chart are arranged alternately with tone-changeable areas of said tone-changing areas in a tone-changing direction of the tone-changing areas.

25. An image output device according to claim 23, wherein said test chart data has a particular pattern that is visually distinguishable according to a tone difference between said tone-changing areas and said tone-fixed areas.

26. An image output device according to claim 25, wherein said tone-fixed areas of said third proof part of said test chart comprise a halftone pattern having a different dot gain from that of said tone-changing areas.

27. An image output device according to claim 26, wherein said tone-fixed areas of said third proof part comprises one of a checkered pattern and a parallel line pattern.

28. An image output device for printing a color of different tones on a medium, comprising:
- a function for outputting, on said medium, test chart data having tone-changing areas where a tone of a color to be printed changes in steps arranged alternately with tone-fixed areas where a predetermined tone of said color is printed, said test chart data comprising a first proof part where said tone-fixed areas are output at a first tone as a tone of a color of said medium and can be compared with tones of said tone-changing areas; a second proof part where said tone-fixed areas are output at a second tone as a highest tone printable by a printer and can be compared with tones of said tone-changing areas; and a third proof part where the tone-fixed areas are output at a tone between said first and second tones and can be compared with tones of said tone-changing areas;
- input means for accepting tone information on said first, second and third proof parts from the result of test chart data output on said medium; and
- adjusting means for adjusting output on said medium based on data for correcting said tone calculated from said tone information input.

29. An image output device according to claim 28, wherein said tone-fixed areas of said third proof part of said test chart are arranged alternately with tone-changeable areas of said tone-changing areas in a tone-changing direction of the tone-changing areas.

30. An image output device according to claim 28, wherein said test chart data has a particular pattern that is visually distinguishable according to a tone difference between said tone-changing areas and said tone-fixed areas.

31. An image output device according to claim 30, wherein said tone-fixed areas of said third proof part of said test chart comprise a halftone pattern having a different dot gain from that of said tone-changing areas.

32. An image output device according to claim 31, wherein said tone-fixed areas of said third proof part comprises one of a checkered pattern and a parallel line pattern.

33. A method of calibrating an image output device using a test chart comprising the steps of:
- producing tone-changing areas on the test chart wherein a tone of a color changes in steps;
- producing tone-fixed areas on the test chart using a predetermined tone of the color, wherein the tone-fixed areas are arranged alternately with the tone-changing areas,
- comparing tone values of adjacent areas of the tone-changing areas and the tone-fixed areas; and
- determining when a tone difference between the compared tone values of adjacent areas of said tone-changing areas and said tone-fixed areas is greater than a specified magnitude.

34. A method of calibrating an image output device using a test chart comprising the steps of:
- producing tone-changing areas on the test chart wherein a tone of a color output from the image output device changes in steps;
- producing tone-fixed areas on the test chart using a predetermined tone of the color;
- creating a first proof part wherein the tone-changing areas are arranged alternately with the tone-fixed areas and output at a first tone capable of being compared to tones of the tone-changing areas;
- creating a second proof part wherein the tone-fixed areas are output at a second tone greater than the first tone;
- creating a third proof part wherein the tone-fixed areas are output at a tone between the first tone and the second tone; and
- reading tone values having a difference in tone between adjacent pairs of the tone-changing areas and said tone-fixed areas that is greater than a specified magnitude at each of the first, second, and third proof parts from results of test chart data output on the medium.

35. A method of calibrating an image output device using a test chart Comprising the steps of:
- producing tone-changing areas on the test chart wherein a tone of a color output from the image output device changes in steps;
- producing tone-fixed areas on the test chart wherein a predetermined tone of the color is printed;
- creating a first proof part wherein the tone-changing areas are arranged alternately with the tone-fixed areas and output at a first tone;
- creating a second proof part wherein the tone-fixed areas are output at a second tone greater than the first tone;
- creating a third proof part wherein the tone-fixed areas are output at a tone between the first and second tones; and
- reading tone values having a difference in tone between adjacent pair of tone-changing areas and tone-fixed areas that is greater than a specified magnitude at each of said first, second and third proof parts from results of test chart data output on the medium.

36. A method of calibrating an image output device using a test chart comprising the steps of:

producing tone-changing areas on the test chart wherein a tone of a color output changes in steps;

producing tone-fixed areas on the test chart wherein a predetermined tone of the color is printed;

creating a first proof part wherein the tone-changing areas are arranged alternately with the tone-fixed areas and are output at a first tone;

creating a second proof part wherein the tone-fixed areas are output at a second tone corresponding to a greatest tone printable by a printer creating a third proof part wherein the tone-fixed areas are output at a tone between the first and second tones; and reading tone values having a difference in tone between adjacent pairs of the tone-changing areas and the tone-fixed areas that is greater than a specified magnitude at each of the first, second, and third proof parts from results of test chart data output on the medium.

37. A computer readable medium carrying thereon instructions and data for causing an image output device to create a test chart by performing the steps of:

creating tone-changing areas on the test chart wherein a tone of color output from the image output device changes in steps;

creating tone-fixed areas on the test chart wherein a predetermined tone of said color is output from the image output device;

wherein said tone-changing areas are arranged alternately with said tone-fixed areas, and wherein tone values can be read when a tone difference between adjacent areas of said tone-changing areas and said tone-fixed areas is greater than a specified magnitude.

38. A computer readable medium carrying thereon instructions and data for causing an image output device to create a test chart by performing the steps of:

creating tone-changing areas on the test chart wherein a tone of a color output from the image output device changes in steps;

creating tone-fixed areas on the test chart wherein a predetermined tone of said color is output from the image output device;

creating a first proof part wherein said tone-changing areas are arranged alternately with said tone-fixed areas, and wherein said tone-fixed areas are output at a first tone that can be compared with tones of said tone-changing areas;

creating a second proof part wherein said tone-fixed areas are output at a second tone greater than the first tone; and creating a third proof part wherein said tone-fixed areas are output at a tone between said first and second tones;

wherein tone values having a difference in tone between adjacent pairs of said tone-changing areas and said tone-fixed areas greater Than a specified magnitude can be read at each of said first, second, and third proof parts from results of test chart data output on the medium.

39. A computer readable medium carrying thereon instructions and data for causing an image output device to create a test chart by performing the steps of:

creating tone-changing areas on the test chart wherein a tone of a color output from the image output device changes in steps;

creating tone-fixed areas on the test chart wherein a predetermined tone of said color is printed;

creating a first proof part wherein said tone-changing areas are arranged alternately with said tone-fixed areas, and said tone-fixed areas are output at a first tone;

creating a second proof part wherein said tone-fixed areas are output at a second tone greater than said first tone; and creating a third proof part wherein said tone-fixed areas are output at a tone between said first and second tones;

wherein tone values having a difference in tone between adjacent pairs of said tone-changing areas and said tone-fixed areas greater than a specified magnitude can be read at each of said first, second, and third proof parts from results of test chart data output on the medium.

40. A computer readable medium carrying thereon instructions and data for causing an image output device to create a test chart by performing the steps of:

creating tone-changing areas on the test chart wherein a tone of a color output changes in steps;

creating tone-fixed areas on the test chart wherein a predetermined tone of said color is printed;

creating a first proof part wherein said tone-changing areas are arranged alternately with said tone-fixed areas, said tone-fixed areas are output at a first tone;

creating a second proof part wherein said tone-fixed areas are output at a second tone corresponding to a greatest tone printable by a printer; and creating a third proof part wherein said tone-fixed areas are output at a tone between said first and second tones;

wherein tone values having a difference in tone between adjacent pairs of said tone-changing areas and said tone-fixed areas greater than a specified magnitude can be read at each of said first, second and third proof parts from results of test chart data output on the medium.

* * * * *